(12) United States Patent
Tauzer

(10) Patent No.: US 9,433,992 B1
(45) Date of Patent: Sep. 6, 2016

(54) BULGE FORMING APPARATUS AND METHOD

(71) Applicant: THE BOEING COMPANY, Chicago, IL (US)

(72) Inventor: Paul J. Tauzer, Auburn, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/673,978

(22) Filed: Mar. 31, 2015

(51) Int. Cl.
| | |
|---|---|
| *B21D 26/12* | (2006.01) |
| *B21D 26/033* | (2011.01) |
| *B21D 26/00* | (2006.01) |
| *B21D 26/02* | (2011.01) |
| *B21D 26/055* | (2011.01) |
| *B21D 22/12* | (2006.01) |
| *B29C 51/02* | (2006.01) |

(52) U.S. Cl.
CPC ............ *B21D 26/033* (2013.01); *B21D 22/12* (2013.01); *B21D 26/00* (2013.01); *B21D 26/02* (2013.01); *B21D 26/055* (2013.01); *B29C 51/02* (2013.01)

(58) Field of Classification Search
CPC ...... B21D 26/00; B21D 26/02; B21D 22/12; B21D 26/055; B29C 51/02
USPC ........................................................... 72/58
See application file for complete search history.

(56) References Cited

U.S. PATENT DOCUMENTS

| | | | | | |
|---|---|---|---|---|---|
| 2,728,317 | A | * | 12/1955 | Clevenger | B21D 26/02 29/421.1 |
| 3,530,699 | A | * | 9/1970 | Uberbacher | B29C 51/02 264/219 |
| 4,951,491 | A | * | 8/1990 | Lorenz | B21D 26/055 29/421.1 |
| 4,984,348 | A | * | 1/1991 | Cadwell | B21D 26/055 29/423 |
| 5,419,171 | A | | 5/1995 | Bumgarner | |
| 5,540,075 | A | * | 7/1996 | Hall, Jr. | B21D 22/12 72/60 |
| 5,649,438 | A | * | 7/1997 | Hall, Jr. | B21D 26/02 72/60 |
| 7,802,457 | B2 | * | 9/2010 | Golovashchenko | B21D 26/00 29/419.2 |

* cited by examiner

*Primary Examiner* — David B Jones
(74) *Attorney, Agent, or Firm* — Perman & Green LLP

(57) ABSTRACT

A bulge forming apparatus including a valve, and a forming die connected to the valve, the forming die including a forming chamber, the forming chamber being configured to receive a blank part and having a working surface, a seal disposed between the working surface and the blank part such that a sealed volume is formed between the blank part and the working surface, and a passage disposed through the forming die such that one end of the passage is open to the sealed volume and another end of the passage is coupled to the valve.

13 Claims, 9 Drawing Sheets

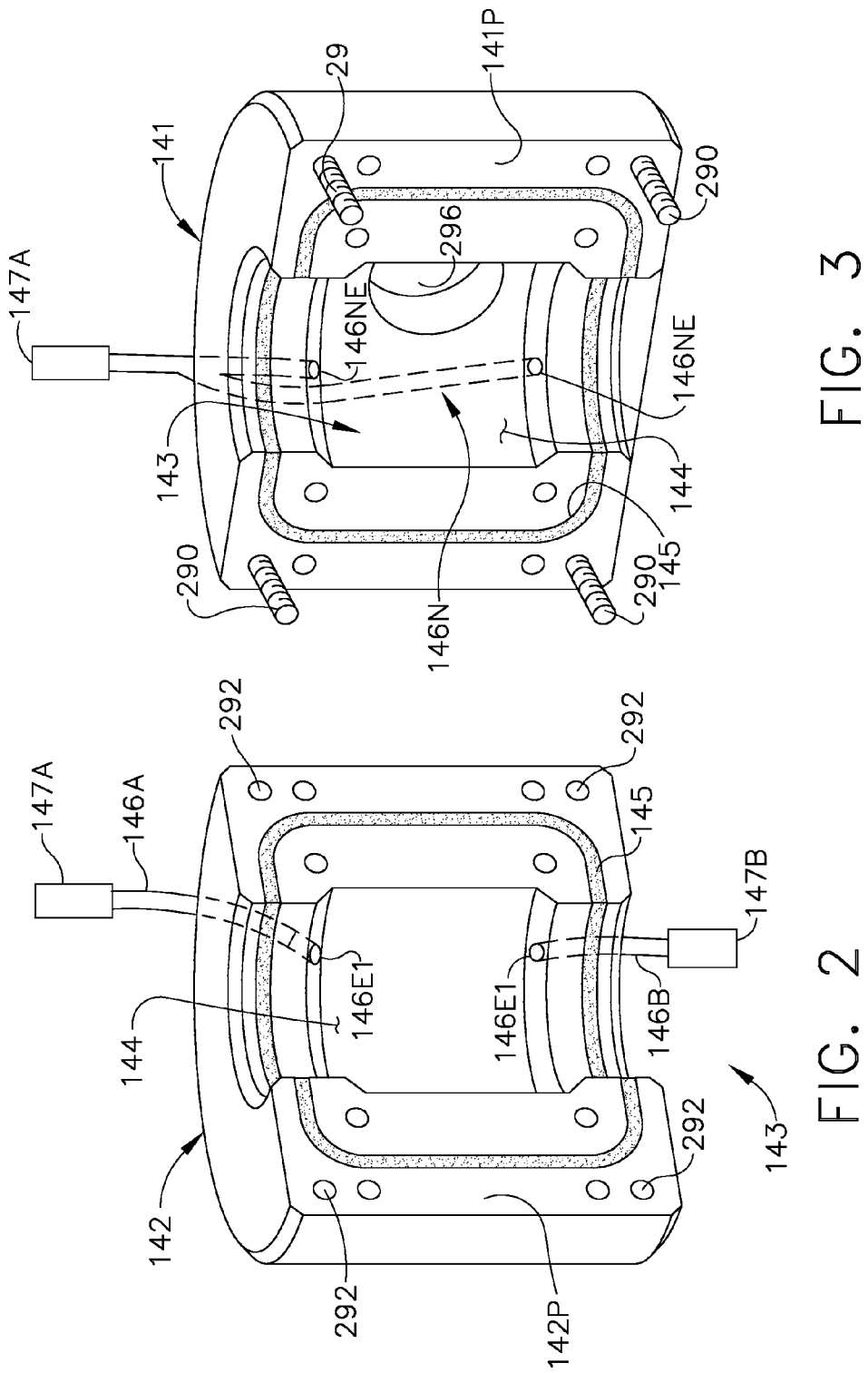

BULGE FORMING APPARATUS AND METHOD

BACKGROUND

The isostatic bulge forming process for forming blank parts employs a pressure vessel that can be pressurized up to about 20,000 lbs/in$^2$ (PSI) or greater. For the forming operation a blank part, such as a tube blank, is placed into two mating female die sections that are bolted together to contain the blank part where an area between the outer surface of the blank part and an interior working surface of the die cavity is sealed off with a suitable seal that prevent pressurized forming fluid from entering the die cavity. The ends of the blank part are open to a forming fluid contained in the pressure vessel so that as the pressure of the forming fluid increases the forming fluid exerts pressure on an inner surface of the blank part thereby expanding or otherwise pressing the outer surface of the blank part against the working surface of the die cavity.

As a result of the seal preventing forming fluid entry into the die cavity air that is trapped within the die cavity cannot escape and is compressed during forming of the blank part. This compressed air may be sufficient to prevent full formation of the blank part and in some instances causes a reverse form (e.g. denting in) of the tube blank which results in a deformed part. Conventionally, the air in the die cavity is released in a two part forming process where the tube blank is partially formed, the die is removed from the pressure vessel and the die sections are unbolted or separated to release the compressed/pressurized air in the die cavity. The die sections are reassembled and the die is placed back into the pressure vessel where the forming process is repeated to completely form the blank part. Removal of the die from the pressure vessel, disassembling the die to release the air in the die cavity, reassembling the die and repeating the forming process is laborious and time consuming which increases the production cost of forming the blank part.

SUMMARY

Accordingly, apparatus and method, intended to address the above-identified concerns, would find utility.

One example of the present disclosure relates to a bulge forming apparatus. The bulge forming apparatus includes a valve, and a forming die connected to the valve, the forming die including a forming chamber, the forming chamber being configured to receive a blank part and having a working surface, a seal disposed between the working surface and the blank part such that a sealed volume is formed between the blank part and the working surface, and a passage disposed through the forming die such that one end of the passage is open to the sealed volume and another end of the passage is coupled to the valve.

One example of the present disclosure relates to a bulge forming apparatus. The bulge forming apparatus includes a tooling fixture including a check valve, and a forming die connected to the check valve, the forming die including a forming chamber, the forming chamber being configured to receive a blank part and having a working surface, a seal disposed between the working surface and the blank part such that a sealed volume is formed between the blank part and the working surface, and a passage disposed through the forming die such that one end of the passage is open to the sealed volume and another end of the passage is coupled to the check valve. The bulge forming apparatus further includes a pressure chamber having an interior that is sized for insertion of the tooling fixture within the interior, wherein the pressure chamber is configured to seal the tooling fixture within the interior.

One example of the present disclosure relates to a method for bulge forming a blank part. The method includes increasing a pressure of an incompressible fluid acting against a blank part with a pressurization unit so that the fluid interacts with the blank part to expand the blank part against a working surface of a forming die, wherein expansion of the blank part decreases a size of a sealed volume disposed between the blank part and the working surface, and releasing gas from the sealed volume into the incompressible fluid with a valve that is in communication with the sealed volume.

BRIEF DESCRIPTION OF THE DRAWINGS

Figure 1:
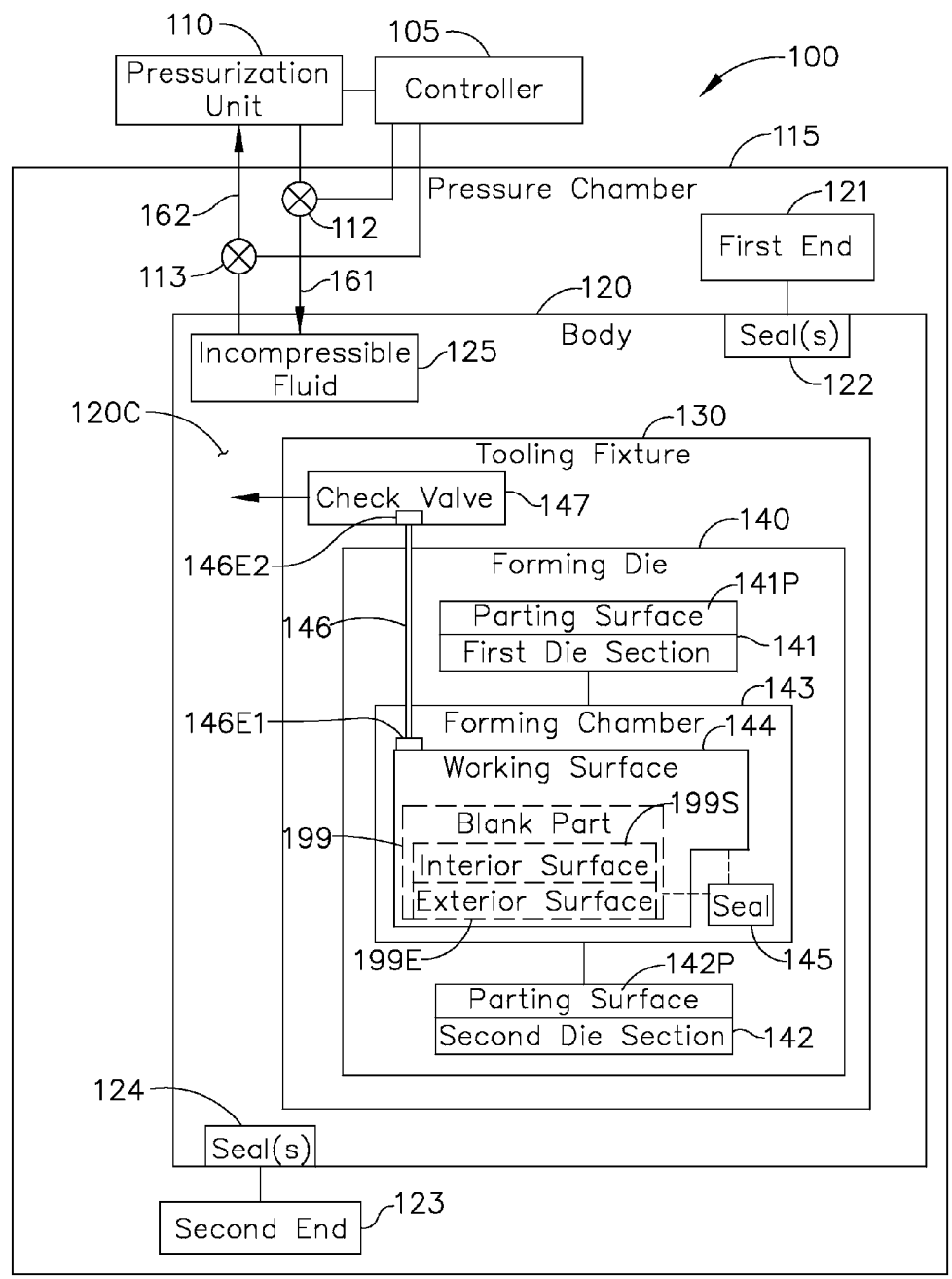
Figure 4:
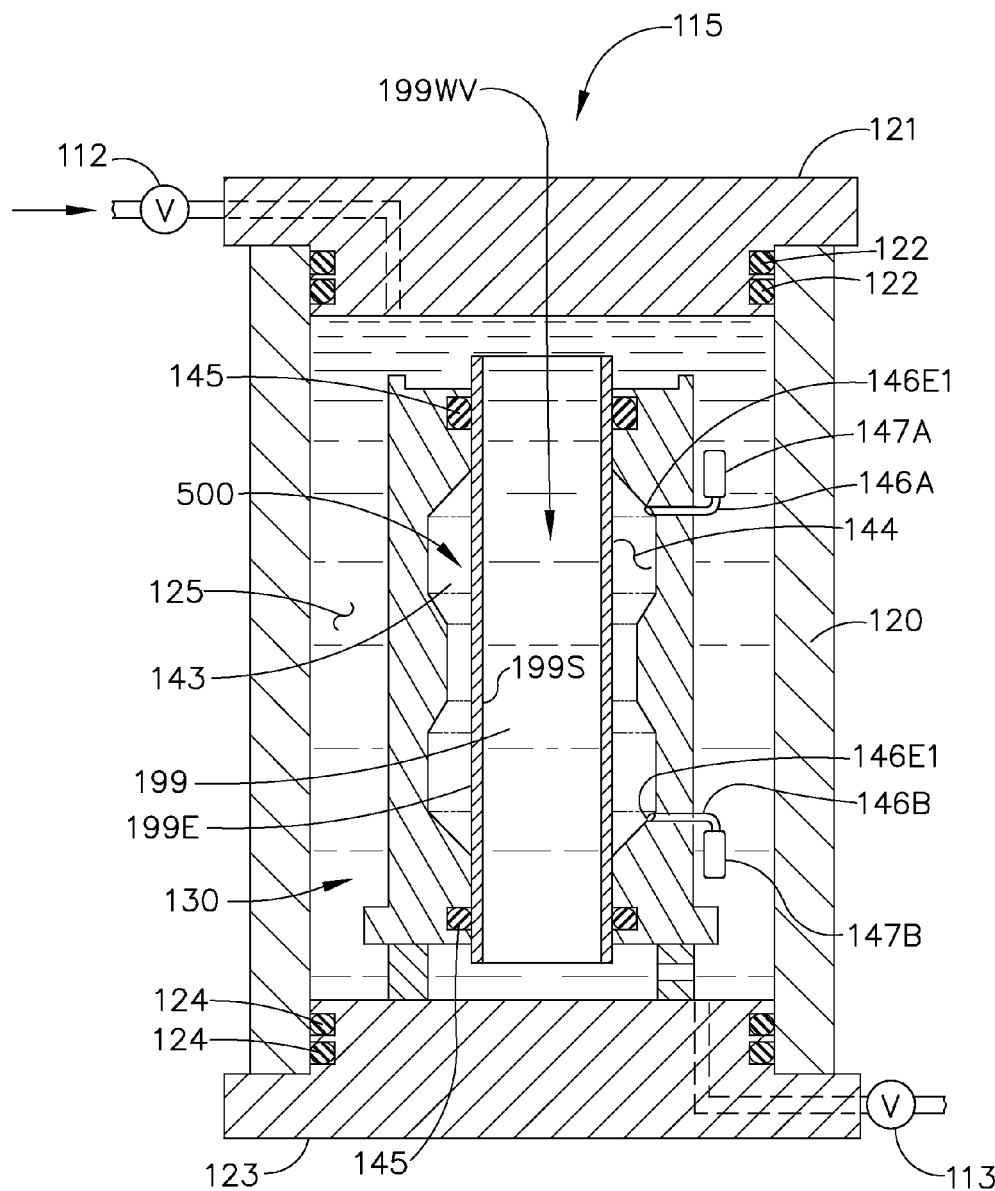
Figure 5:
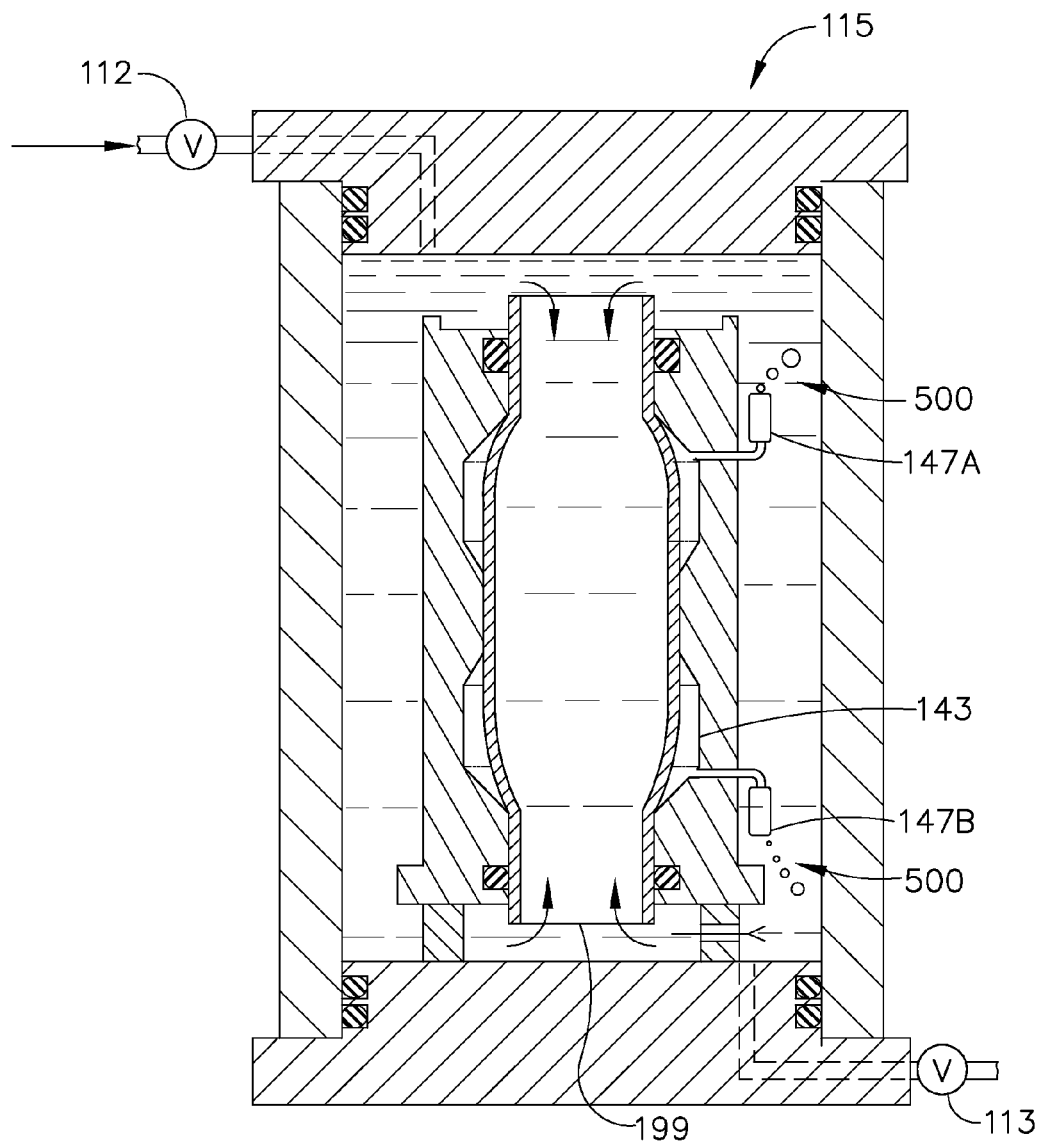
Figure 6:
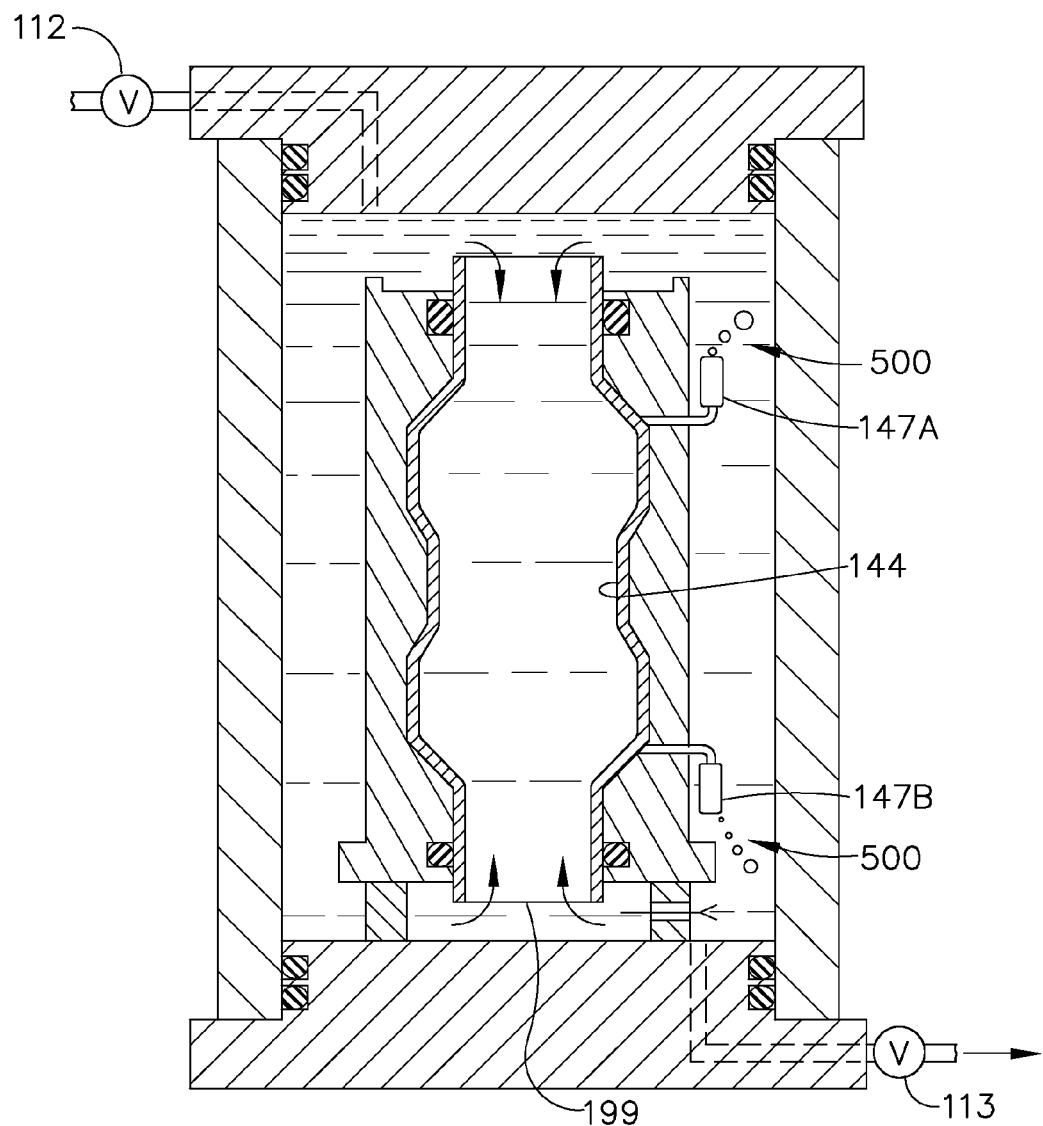
Figure 7:
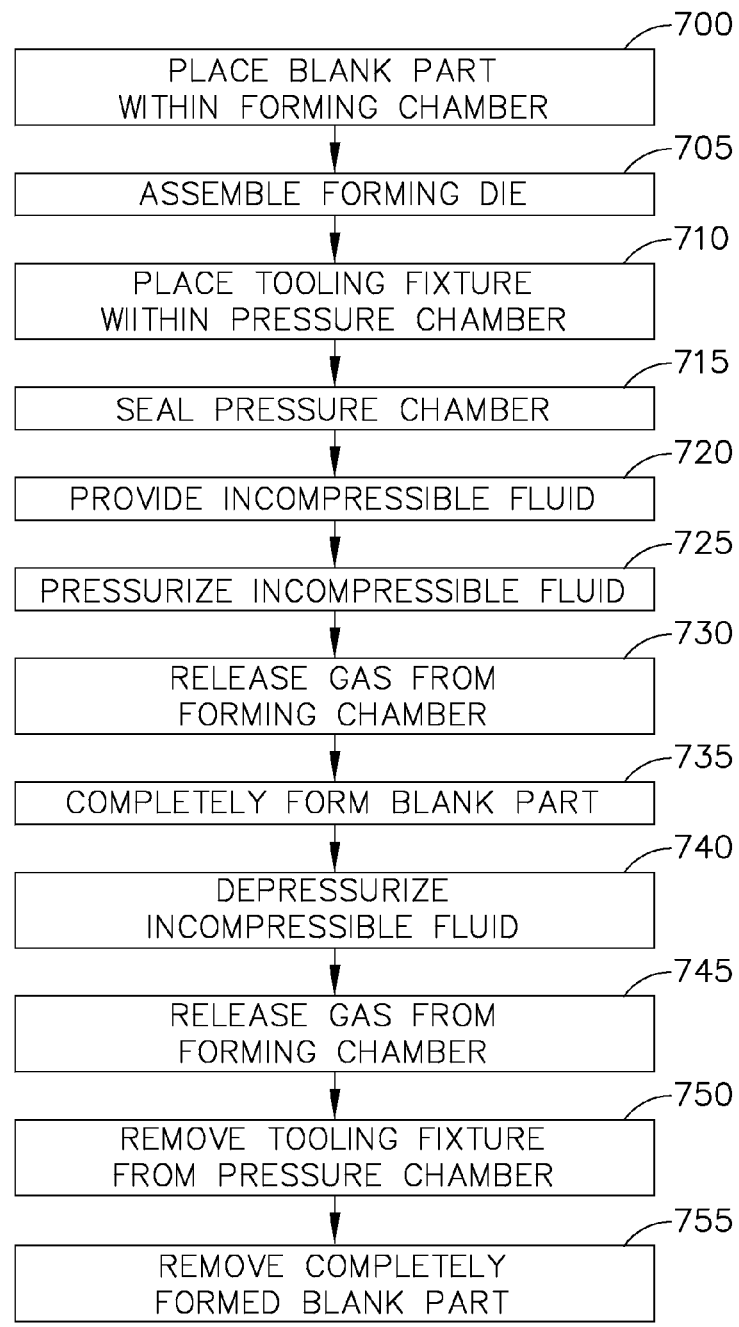
Figure 8:
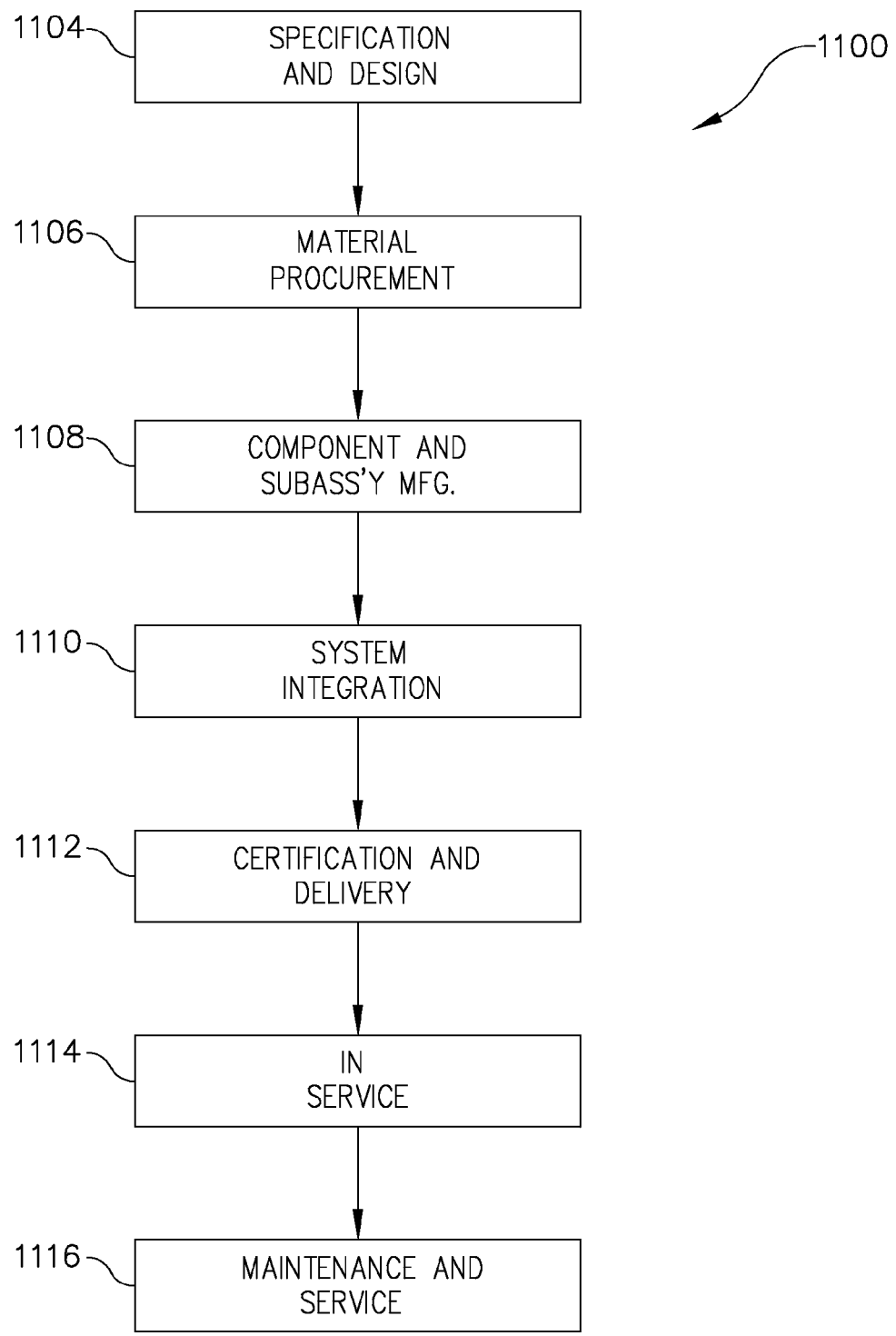
Figure 9:
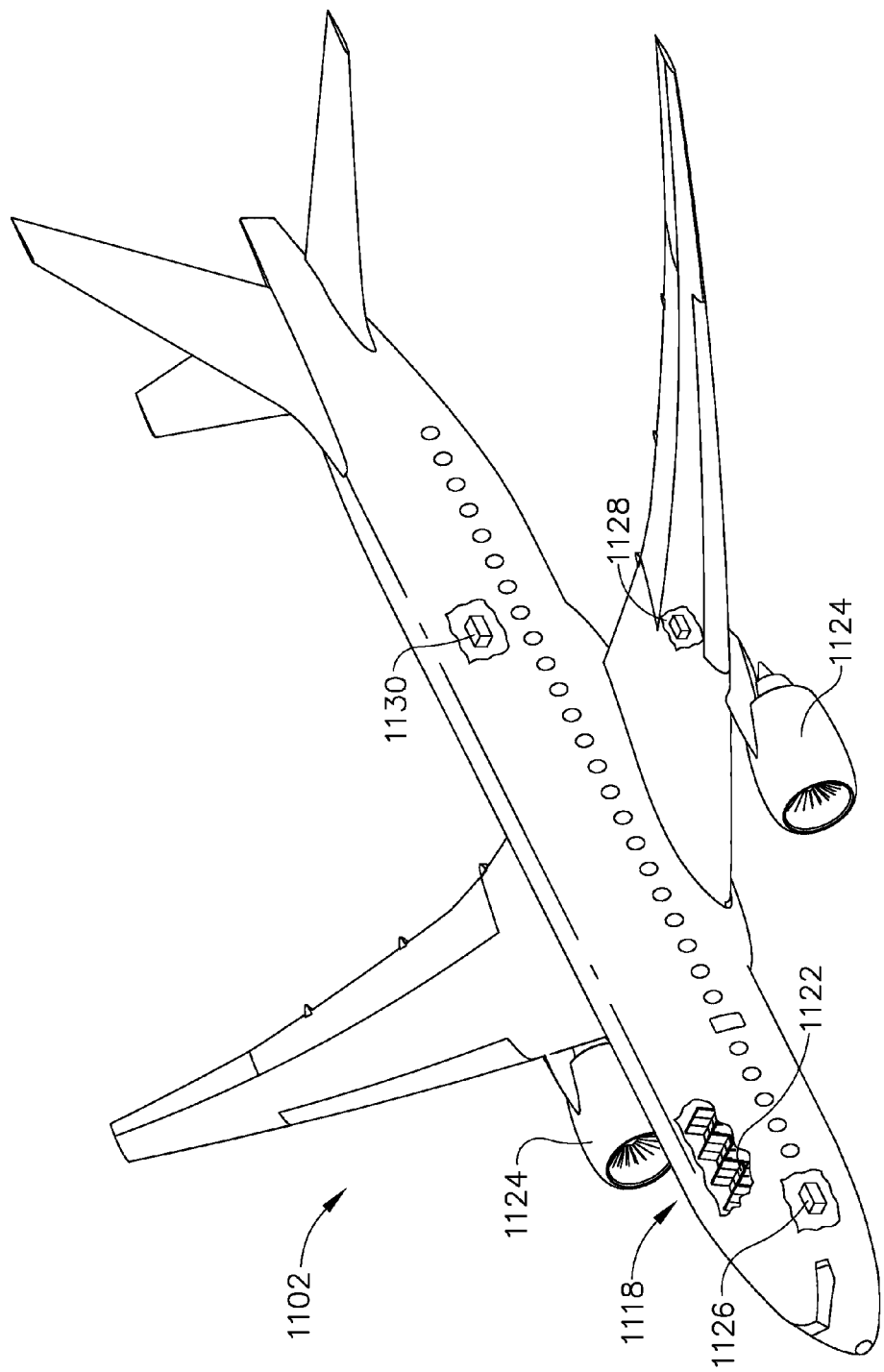
Figure 10:
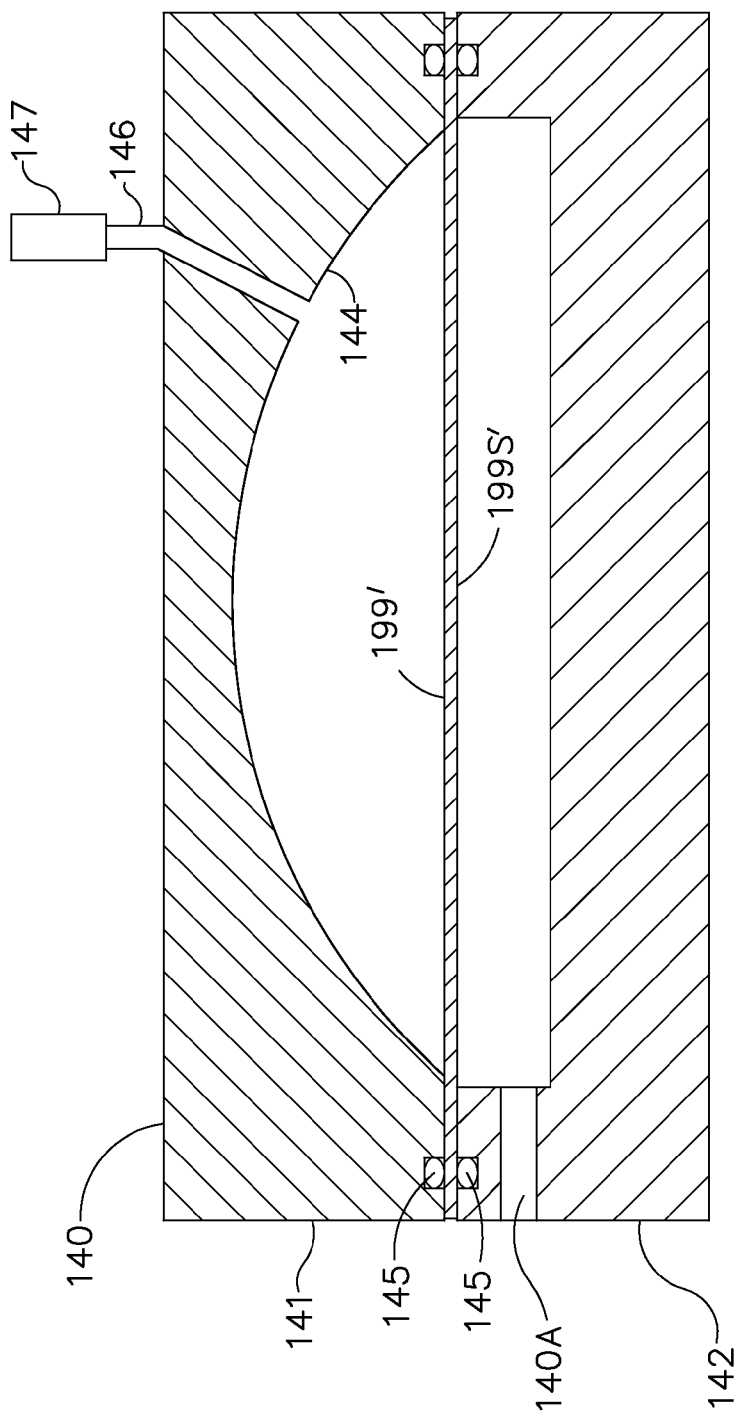

Having thus described examples of the disclosure in general terms, reference will now be made to the accompanying drawings, which are not necessarily drawn to scale, and wherein like reference characters designate the same or similar parts throughout the several views, and wherein:

FIG. 1 is a block diagram of a bulge forming apparatus, according to one aspect of the present disclosure;

FIG. 2 is a diagrammatic representation of a portion of a forming die, according to one aspect of the present disclosure;

FIG. 3 is a diagrammatic representation of a portion of a forming die, according to one aspect of the present disclosure;

FIG. 4 is a diagrammatic cross-sectional representation of a bulge forming process, according to one aspect of the present disclosure;

FIG. 5 is a diagrammatic cross-sectional representation of a bulge forming process, according to one aspect of the present disclosure;

FIG. 6 is a diagrammatic cross-sectional representation of a bulge forming process, according to one aspect of the present disclosure;

FIG. 7 is a flow diagram of a bulge forming process, according to one aspect of the present disclosure;

FIG. 8 is a flow diagram of aircraft production and service methodology;

FIG. 9 is a diagrammatic representation of an aircraft including distributed vehicle systems; and FIG. 10 is a diagrammatic cross-sectional representation of a forming die, according to one aspect of the present disclosure.

In the block diagram(s) referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings other than those depicted in the block diagrams may also exist. Dashed lines, if any, connecting the various elements and/or components represent couplings similar in function and purpose to those represented by solid lines; however, couplings represented by the dashed lines may either be selectively provided or may relate to alternative or optional aspects of the disclosure. Likewise, elements and/or components, if any, represented with dashed lines, indicate alternative or optional aspects of the disclosure. Environmental elements, if any, are represented with dotted lines.

In the block diagram(s) referred to above, the blocks may also represent operations and/or portions thereof. Lines connecting the various blocks do not imply any particular order or dependency of the operations or portions thereof.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Referring to FIG. 1, a diagrammatic representation of a bulge forming apparatus 100 is shown. In one aspect, the bulge forming apparatus 100 includes a tooling fixture 130 having a forming die 140 that is connected to one or more suitable valves such as check valves 147 through one or more passages 146. In one aspect, the valves are any suitable actuable valves that allow fluid to escape the forming die 140 while preventing ingress of fluid into the forming die through the valves. The forming die 140 includes at least two die sections (a first and second die sections 141, 142 are illustrated for exemplary purposes only) which when coupled together at respective parting surfaces 141P, 142P form a forming chamber 143 into which a blank part 199 is placed for forming. The forming chamber 143 has any desired shape that corresponds with the part to be produced by the forming die 140. In one aspect the forming die 140 and forming chamber 143 are configured, as will be described below, so that a pressurized incompressible fluid 125 (e.g. a forming fluid that may be oil, water or any other suitable incompressible fluid) flows within an interior or working volume 199WV (see FIG. 4) of the blank part 199 (which may be in the form of a tube having an interior surface 199S and an exterior surface 199E) so as to expand or press the blank part against a working surface 144 of the forming chamber 143. The pressure exerted on the blank part 199 by the pressurized incompressible fluid 125 effects a plastic deformation of the blank part 199 so that the blank part 199 conforms to the shape of the forming chamber 143 (e.g. to completely form the blank part). In other aspects, referring to FIG. 10, the forming die includes an aperture 140A into which pressurized the incompressible fluid 125 flows so as to interface with a single side 199S' of the blank part (such as when the blank part is a substantially flat sheet or bar) for pressing the blank part substantially against the working surface 144 of the forming chamber 143.

As will be described in greater detail below the check valve 147 is in fluid communication with the forming chamber 143 so that as the blank part 199 is formed the check valve 147 allows gas within the forming chamber 143 to escape or be released from the forming chamber 143. The release of gas from the forming chamber 143 substantially eliminates pressure buildup between the blank part 199 and the working surface 144 and provides for forming the blank part in a single pressurization of the incompressible fluid 125 (e.g. the forming die 140 is not disassembled to release the gas in the forming chamber and the forming process is not repeated multiple times on the same blank part).

Still referring to FIG. 1, the bulge forming apparatus also includes a pressure chamber 115 (e.g. a pressure vessel) into which the tooling fixture 130 is placed for forming the blank part 199. The pressure chamber 115 includes a body or frame 120 that forms a cavity 120C therein, a first end 121 in the form of a cap or cover for sealing at least one end of the cavity 120C, and a second end 123 in the form of a cap or cover for sealing another end of the cavity 120C. In other aspects the pressure chamber 115 has any suitable configuration for holding a pressurized incompressible fluid and allowing the insertion and removal of the tooling fixture 130 to and from the cavity 120C. As may be realized, any suitable seals 122, 124 are disposed between the first end 121 and the body 120 and between the second end 123 and the body 120 so as to contain the incompressible fluid within the cavity 120C while the blank part 199 is being formed. The incompressible fluid 125 is fed into the cavity 120C through any suitable conduit 161 through which the flow of the incompressible fluid 125 is controlled by any suitable valve 112. The incompressible fluid 125 is removed from the cavity 120C by any suitable conduit 162 through which the flow of the incompressible fluid 125 is controlled by any suitable valve 113. In one aspect the conduit 161 is connected to any suitable pressurization unit 110, such as a pump, which provides the incompressible fluid to the cavity 120C and pressurization of the incompressible fluid 125 for forming the blank part 199. In one aspect the conduit 162 is connected to any suitable fluid reservoir that stores the incompressible fluid 125. In one aspect the fluid reservoir supplies the incompressible fluid 125 to the pressurization unit 110 while in other aspects the fluid reservoir is integrated with the pressurization unit. In one aspect one or more of the pressurization unit 110, valve 112 and valve 113 is connected to any suitable controller 105 for controlling the operation of the one or more of the pressurization unit 110, valve 112 and valve 113. In one aspect the valves 112, 113 are operated manually while in other aspects the valves 112, 113 and pressurization are controlled in sequence by the controller 105 so that valve 113 is closed, valve 112 opens and the pressurization unit 110 provides flow of and pressurization of the incompressible fluid within the cavity 120C for a predetermined time period for forming the blank part 199 as described in greater detail below. In other aspects the pressurization unit 110 is manually controlled. In one aspect, once the blank part 199 is formed the controller 105 controls the pressurization unit 110 so as to stop the flow of and pressurization of the incompressible fluid 125, close the valve 112 and open valve 113 so that the pressure within cavity 120C is released and the incompressible fluid is evacuated from the cavity 120C so that the tooling fixture may be removed from the cavity 120C.

Referring now to FIGS. 1, 2 and 3, in one aspect, as described above, the tooling fixture 130 includes two or more die sections 141, 142. Each die section 141, 142 includes a respective parting surface 141P, 142P at which the die sections (in this example the first and second die sections 141, 142) mate or interface with each other. Any suitable seal(s) 145 are provided on one or more of the parting surfaces 141P, 142P for sealing an interface formed between the first and second die sections 141, 142 through substantial contact of the parting surfaces 141P, 142P when the die sections 141, 142 are assembled. The seal(s) 145 also extend into at least a portion of the forming chamber 143 so as to provide a seal between the blank part 199 and the forming chamber 143 so as to prevent incompressible fluid 125 flow between the blank part 199 and the working surface 144. The first and second die portions 141, 142 are joined together with any suitable fasteners 290, 292 such as bolts and threaded holes/nuts, clamps, straps or any other suitable fasteners configured to hold the die sections 141, 142 together during the bulge forming process. In one aspect, a depression 296 is located in the working surface 144 and is configured so that as the blank part 199 is pressed against the working surface 144 during forming, a portion of the blank part 199 flows or is deformed into the depression 296 to form a "knock out" which can be removed from the completely formed blank part 199 in any suitable manner, such as to provide a hole in the completely formed blank part 199.

The first and second die sections 141, 142 have any suitable exterior shape that allows for insertion of the assembled tooling fixture 130 into the cavity 120C of the pressure chamber 115. A portion of the forming chamber 143 is formed in each of the first and second die sections 141, 142 so that when the first and second die sections 141, 142 are assembled the forming chamber 143 has the shape of a completely formed blank part 199 (i.e. a finished bulge formed part). As such, the working surface 144 of the forming chamber 143 has one or more contours that provide for movement or expansion of the blank part 199 during forming. As will be described below, these contours in the working surface provide for voids or spaces (e.g. sealed volumes) between the working surface 144 and the unformed blank part 199 in which gas 500 can be trapped. One or more passages 146 are provided through one or more of the first and second die sections 141, 142 where one end 146E1 of the one or more passages 146 passes through the working surface 144 and the other end 146E2 is coupled to a respective check valve 147A, 147B. In the example, illustrated in FIG. 2 there are two check valves 147A, 147B in communication with an interior of the forming chamber through a respective one of passages 146A, 146B however, in other aspects any suitable number (e.g. one or more than one) of check valves 147 are in communication with an interior of the forming chamber 143 through any suitable number (e.g. one or more than one) of passages 146. In one aspect, the end 146E1 of the respective passage 146A, 146B terminates in a hole or aperture at the working surface where the hole is sized to substantially prevent entry of the blank part into the passage 146A, 146B. The end 146E1 of the respective passage 146A, 146B is located at any suitable location within the forming chamber such as, for example, at a deepest part of the forming chamber 143 (where the deepest part of the forming chamber 143 means a part of the forming chamber 143 that allows for the greatest movement or volumetric change of the blank part 199 within the forming chamber 143 during forming of the blank part 199). In other aspects, the end 146E1 of the respective passage is located at radiuses of the working surface 144 or any other suitable area of the forming chamber 143 in which gas can be trapped as the blank part is pressed against the working surface 144. The other end 146E2 of the passage 146A, 146B terminates at any suitable location on an exterior surface of the forming die 140 for connection to a respective check valve 147A, 147B.

In one aspect, referring to FIG. 3 the one or more passage 146 includes a passage network 146N. In one aspect the passage network or manifold 146N includes multiple passages each have a respective end 146NE that opens up into the forming chamber 143 as described above. However, in this aspect each of the multiple passages terminate at the other end in a common passage to which a common check valve 147A is coupled. In other aspects, the forming die 140 includes groups of passage networks or manifolds 146N each having a respective common check valve.

Referring now to FIGS. 4-7 a bulge forming process is described in accordance with an aspect of the present disclosure. The blank part 199 is placed into the forming chamber 143 of at least one of the die sections 141, 142 (FIG. 7, Block 700). The other die sections 141, 142 are aligned with and coupled to the at least one of the die sections 141, 142 (e.g. the forming die is assembled) such that the parting interfaces 141P, 142P are sealed by the seal(s) 145 and the blank part 199 is sealed against the forming chamber 143 by the seal(s) 145 (FIG. 7, Block 705). The tooling fixture 130 is placed within the cavity 120C of the pressure chamber 115 (FIG. 7, Block 710) and the pressure chamber 115 is sealed or otherwise closed (e.g. one or more of the first and second ends 121, 122 are coupled to the body 120) to contain the incompressible fluid 125 that enters the cavity 120C (FIG. 7, Block 715). Incompressible fluid 125 is provided to the cavity 120C through the valve 112 so that the cavity 120C and the interior (which forms a working volume 199WV) of the blank part 199 are filled with the incompressible fluid (FIG. 7, Block 720). As may be realized, the valve 113 is left open so that gas is evacuated from the cavity 120C when the incompressible fluid 125 fills the cavity 120C. As can be seen in FIGS. 4-6 the entire tooling fixture (including the one more check valves 147) is submersed in the incompressible fluid 125.

As can be seen best in FIG. 4 a void or space exists between the exterior surface 199E of the blank part 199 and the working surface 144 of the forming chamber 143. As described above, this space is sealed from the incompressible fluid 125 by the seal(s) 145 that seal the parting surfaces 141P, 142P of the die sections 141, 142 and that seal the blank part 199 against the forming chamber 143. While the seal(s) 145 prevent the entry of the incompressible fluid 125 into the spaces of the forming chamber 143, the seals also prevent the release of the gas 500 held within the spaces when the blank part 199 is being formed. As will be described below, the one or more check valves 147 allow for the release of the gas 500 from the spaces during forming of the blank part as well as prevent the flow of incompressible fluid 125 into the forming chamber 143.

The valve 113 is closed and the pressurization unit 110 pressurizes the incompressible fluid 125 within the cavity 120C and thus within the working volume 199WV of the blank part 199 (FIG. 7, Block 725). The pressurized incompressible fluid 125 flows into the working volume 199WV (as indicated by the arrows in FIG. 5) and exerts force on the interior surface 199S of the blank part within the working volume 199WV so that the blank part is pressed or plastically deformed towards or substantially against the working surface 144. The movement of the blank part 199 towards the working surface 144 compresses the gas 500 within the spaces of the forming chamber 143 so that the gas 500 is compressed in one or more passage 146 and pressure builds inside the one or more check valves 147, such as check valves 147A, 147B (FIG. 7, Block 730). The pressurization unit 110 continues to pressurize or maintain pressure of the incompressible fluid 125 so that the exterior surface 199E of the blank part 199 is in substantial contact with the working surface 144 and a completely formed blank part is produced (FIG. 7, Block 735). The pressurization unit 110 stops pressurizing the incompressible fluid 125 and the valve 113 is opened to allow the release of the incompressible fluid 125 from and/or depressurization of the incompressible fluid 125 within the cavity 120C (FIG. 7, Block 740). The depressurization of the incompressible fluid 125 causes a release of the gas 500 into the incompressible fluid, through the one or more check valves 147, from the empty spaces in the forming chamber 143 (and e.g. from within the one or more passage 146) so that as the pressure of the incompressible fluid decreases the pressure of the gas 500 is not sufficient to cause a reverse form of the completely formed blank part 199 (FIG. 7, Block 745). The pressure chamber 115 is opened and the tooling fixture 130 is removed from the cavity 120C (FIG. 7, Block 750). The die sections 141, 142 of the tooling fixture 130 are disassembled and the completely formed blank part 199 is removed from the forming chamber 143 (FIG. 7, Block 755).

As can be seen from the above description and in accordance with the aspects of the present disclosure the blank part 199 can be formed with a single pressurization of the incompressible fluid within the cavity 120C (and within the working volume 199WV of the blank part 199) and be formed free from operator manipulation of the forming die 140. For example, the tooling fixture 130 does not have be removed from the cavity 120C (e.g. during the forming process) to release compressed gas between a partially formed blank part and the working surface 144 of the forming chamber 143 before the blank part can be completely formed. The aspects of the present disclosure reduce the number of steps required for a bulge forming operation as well as decreases the processing time for bulge forming by up to, for example, about 50% over conventional bulge forming processes which are typically performed in two steps/stages.

The disclosure and drawing figures describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Examples of the disclosure may be described in the context of an aircraft manufacturing and service method 1100 as shown in FIG. 8 and an aircraft 1102 as shown in FIG. 9. During pre-production, illustrative method 1100 may include specification and design 1104 of the aircraft 1102 and material procurement 1106. During production, component and subassembly manufacturing 1108 and system integration 1110 of the aircraft 1102 take place. Thereafter, the aircraft 1102 may go through certification and delivery 1112 to be placed in service 1114. While in service by a customer, the aircraft 1102 is scheduled for routine maintenance and service 1116 (which may also include modification, reconfiguration, refurbishment, and so on).

Each of the processes of the illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 9, the aircraft 1102 produced by the illustrative method 1100 may include an airframe 1118 with a plurality of high-level systems and an interior 1122. Examples of high-level systems, which are distributed throughout the aircraft, include one or more of a propulsion system 1124, an electrical power system 1126, a hydraulic system 1128, and an environmental system 1130. Any number of other systems may be included. Although an aerospace example is shown, the principles of the invention may be applied to other industries, such as the automotive industry.

Apparatus and methods shown or described herein may be employed during any one or more of the stages of the manufacturing and service method 1100. For example, components or subassemblies corresponding to component and subassembly manufacturing 1108 may be fabricated or manufactured in a manner similar to components or subassemblies produced while the aircraft 1102 is in service. Also, one or more aspects of the apparatus, method, or combination thereof may be utilized during the production states 1108 and 1110, for example, by substantially expediting assembly of or reducing the cost of an aircraft 1102. Similarly, one or more aspects of the apparatus or method realizations, or a combination thereof, may be utilized, for example and without limitation, while the aircraft 1102 is in service, e.g., operation, maintenance and service 1116.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

In one or more aspects of the present disclosure a bulge forming apparatus includes a valve; and a forming die connected to the check valve, the forming die including a forming chamber, the forming chamber being configured to receive a blank part and having a working surface, a seal disposed between the working surface and the blank part such that a sealed volume is formed between the blank part and the working surface, and a passage disposed through the forming die such that one end of the passage is open to the sealed volume and another end of the passage is coupled to the valve.

In one or more aspects of the present disclosure the bulge forming apparatus further includes a pressure chamber configured to hold an incompressible fluid and accept insertion of the valve and forming die so that both the valve and forming die are submersed in the incompressible fluid wherein the incompressible fluid is disposed within a working volume formed by the blank part.

In one or more aspects of the present disclosure the valve is configured to release gas from the sealed volume into the incompressible fluid within the pressure chamber due to a decrease in the sealed volume.

In one or more aspects of the present disclosure the valve is configured to release gas from the sealed volume into the incompressible fluid within the pressure chamber as a pressure within the pressure chamber is decreased.

In one or more aspects of the present disclosure the bulge forming apparatus further includes a fluid pressurization unit connected to the pressure chamber, the fluid pressurization unit being configured to pressurize the incompressible fluid within the pressure chamber and the working volume to effect expansion of the blank part against at least part of the working surface.

In one or more aspects of the present disclosure the one end of the passage is disposed at a portion of the forming chamber that allows a largest expansion of the blank part within the forming chamber.

In one or more aspects of the present disclosure the valve is a check valve.

In one or more aspects of the present disclosure a bulge forming apparatus includes a tooling fixture including a check valve, and a forming die connected to the check valve, the forming die including a forming chamber, the forming chamber being configured to receive a blank part and having a working surface, a seal disposed between the working surface and the blank part such that a sealed volume is formed between the blank part and the working surface, and a passage disposed through the forming die such that one end of the passage is open to the sealed volume and another end of the passage is coupled to the check valve; and a pressure chamber having an interior that is sized for insertion of the tooling fixture within the interior, wherein the pressure chamber is configured to seal the tooling fixture within the interior.

In one or more aspects of the present disclosure the one end of the passage is disposed at a portion of the forming chamber that allows a largest expansion of the blank part within the forming chamber.

In one or more aspects of the present disclosure the pressure chamber is configured to hold an incompressible fluid so that the tooling fixture is submersed in the incompressible fluid and the incompressible fluid is disposed within a working volume formed by the blank part.

In one or more aspects of the present disclosure the check valve is configured to release gas from the sealed volume into the incompressible fluid within the pressure chamber due to a decrease in the sealed volume.

In one or more aspects of the present disclosure the check valve is configured to release gas from the sealed volume into the incompressible fluid within the pressure chamber as a pressure within the pressure chamber is decreased.

In one or more aspects of the present disclosure the bulge forming apparatus further includes a fluid pressurization unit connected to the pressure chamber, the fluid pressurization unit being configured to pressurize the incompressible fluid within the pressure chamber and the working volume to effect expansion of the blank part against at least part of the working surface.

In one or more aspects of the present disclosure a method for bulge forming a blank part includes increasing a pressure of an incompressible fluid acting against a blank part with a pressurization unit so that the fluid interacts with the blank part to expand the blank part against a working surface of a forming die, wherein expansion of the blank part decreases a size of a sealed volume disposed between the blank part and the working surface; and releasing gas from the sealed volume into the incompressible fluid with a valve that is in communication with the sealed volume.

In one or more aspects of the present disclosure the forming chamber and valve are part of a tooling fixture, the method further comprising placing the tooling fixture within a pressure chamber so that the incompressible fluid within the pressure chamber surrounds the forming die and valve and flows through the blank part held within a forming chamber of the tooling fixture.

In one or more aspects of the present disclosure the blank part is a tube blank.

In one or more aspects of the present disclosure the method further includes preventing incompressible fluid flow into the sealed volume with the valve.

In one or more aspects of the present disclosure the method further includes releasing gas from the sealed volume with the valve as the sealed volume decreases.

In one or more aspects of the present disclosure the method further includes releasing gas from the sealed volume with the valve as a pressure within the pressure chamber is decreased.

In one or more aspects of the present disclosure the blank part is formed with a single pressurization of the incompressible fluid.

In one or more aspects of the present disclosure the valve eliminates back pressure against the blank part during the expansion of the blank part towards the working surface.

In one or more aspects of the present disclosure the valve is a check valve.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. A bulge forming apparatus comprising:
   a valve;
   a forming die connected to the valve, the forming die including
      a forming chamber, the forming chamber being configured to receive a blank part and having a working surface,
      a seal disposed between the working surface and the blank part such that a sealed volume is formed between the blank part and the working surface, and
      a passage disposed through the forming die such that one end of the passage is open to the sealed volume and another end of the passage is coupled to the valve; and
   a pressure chamber configured to accept insertion of the valve and forming die wherein the valve is configured to release gas from the sealed volume into the pressure chamber as a pressure within the pressure chamber is decreased.

2. The bulge forming apparatus of claim 1, wherein the pressure chamber is configured to hold an incompressible fluid so that both the valve and forming die are submersed in the incompressible fluid wherein the incompressible fluid is disposed within a working volume formed by the blank part.

3. The bulge forming apparatus of claim 2, wherein the valve is configured to release gas from the sealed volume into the incompressible fluid within the pressure chamber due to a decrease in the sealed volume.

4. The bulge forming apparatus of claim 2, wherein the valve is configured to release gas from the sealed volume into the incompressible fluid within the pressure chamber as a pressure within the pressure chamber is decreased.

5. The bulge forming apparatus of claim 2, further comprising a fluid pressurization unit connected to the pressure chamber, the fluid pressurization unit being configured to pressurize the incompressible fluid within the pressure chamber and the working volume to effect expansion of the blank part against at least part of the working surface.

6. The bulge forming apparatus of claim 1, wherein the one end of the passage is disposed at a portion of the forming chamber that allows a largest expansion of the blank part within the forming chamber.

7. The bulge forming apparatus of claim 1, wherein the valve comprises a check valve.

8. A bulge forming apparatus comprising:
   a tooling fixture including
      a check valve, and
      a forming die connected to the check valve, the forming die including
         a forming chamber, the forming chamber being configured to receive a blank part and having a working surface,
         a seal disposed between the working surface and the blank part such that a sealed volume is formed between the blank part and the working surface, and
         a passage disposed through the forming die such that one end of the passage is open to the sealed volume and another end of the passage is coupled to the check valve; and
   a pressure chamber having an interior that is sized for insertion of the tooling fixture within the interior, wherein the pressure chamber is configured to seal the tooling fixture within the interior and the check valve is configured to release gas from the sealed volume into the interior of the pressure chamber as a pressure within the pressure chamber is decreased.

9. The bulge forming apparatus of claim 8, wherein the one end of the passage is disposed at a portion of the forming chamber that allows a largest expansion of the blank part within the forming chamber.

10. The bulge forming apparatus of claim 8, wherein the pressure chamber is configured to hold an incompressible fluid so that the tooling fixture is submersed in the incompressible fluid and the incompressible fluid is disposed within a working volume formed by the blank part.

11. The bulge forming apparatus of claim 10, wherein the check valve is configured to release gas from the sealed volume into the incompressible fluid within the pressure chamber due to a decrease in the sealed volume.

12. The bulge forming apparatus of claim 10, wherein the check valve is configured release gas from the sealed volume into the incompressible fluid within the pressure chamber as a pressure within the pressure chamber is decreased.

13. The bulge forming apparatus of claim 10, further comprising a fluid pressurization unit, connected to the pressure chamber, the fluid pressurization unit being configured to pressurize the incompressible fluid within the pressure chamber and the working volume to effect expansion of the blank part against at least part of the working surface.

\* \* \* \* \*